G. W. EICHHOLTZ.

CHURN-DASHERS.

No. 7,421. Reissued Dec. 12, 1876.

Attest:
A. B. Robertson
W. W. Hollingsworth

Inventor:
George W. Eichholtz,
Per. T. J. W. Robertson
Attorney:

THE GRAPHIC CO. N.Y.

UNITED STATES PATENT OFFICE.

GEORGE W. EICHHOLTZ, OF NORTH MANCHESTER, INDIANA.

IMPROVEMENT IN CHURN-DASHERS.

Specification forming part of Letters Patent No. 167,512, dated September 7, 1875; reissue No. 7,421, dated December 12, 1876; application filed November 8, 1876.

*To all whom it may concern:*

Be it known that I, GEORGE W. EICHHOLTZ, of North Manchester, in the county of Wabash and State of Indiana, have invented a new and valuable Improvement in Churn-Dashers; and I do hereby declare that the following is a full, clear, and exact description of the same, reference being had to the annexed drawings, making a part of this specification, and to the letters and figures of reference marked thereon.

The object of my invention is the production of a churn-dasher, which shall make butter in the shortest possible time, and with the minimum of labor; and to this end I employ a set of perforated swinging presser-boards wide enough to fill the churn-tub, and a set of receiving-boards only wide enough to cover the holes in the pressers, so that the cream will be forced through the latter, and, striking against the under side of the receivers, will, owing to the reduced size of the latter and their perforations, have free vent from the space between the pressers and receivers, and to so arrange these instrumentalities that when the dasher is rising it will pass through the cream with the least possible disturbance, so as to leave it in a solid state, that when descending the dasher will work to the best advantage, as will be more fully shown in the annexed drawings, of which—

Figure 1:
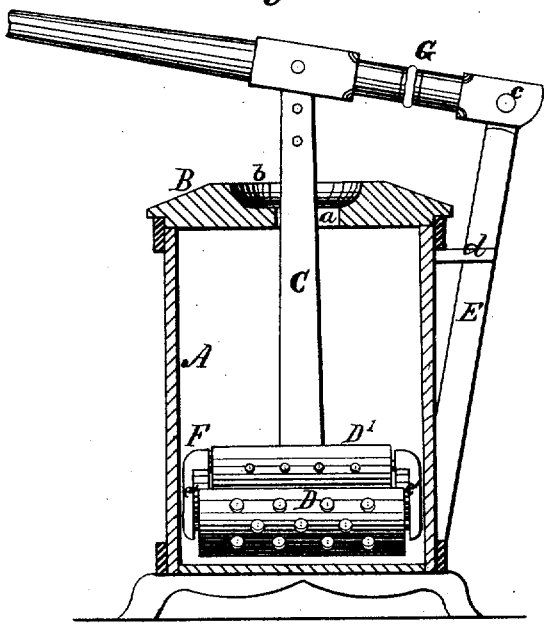
Figure 2:
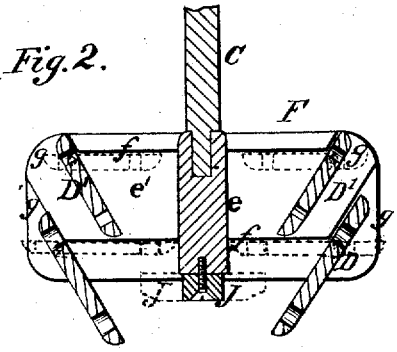

Figure 1 is a representation of a vertical central section of a churn, showing my dasher, and Fig. 2 a vertical central section of the same dasher, taken at right angles to that shown in Fig. 1; and a fuller description of the construction and operation of my dasher, and the churn in which it works, may be given as follows:

A designates a preferably rectangular churn-tub, having a detachable lid, B, through which is cut a slot, *a*, terminating in a cup-shaped circular enlargement, *b*, through which slot is passed a rod, C, operated by means of a vertically-vibrating lever, G, fulcrumed at *c* to an inclined standard, E, rigidly secured at its lower extremity to the tub, and stayed against lateral and outward displacement by a bracket, *d*. Rod C is mortised into the cross-bar *e* of an H-shaped frame, F, the end bars *e'* of which are provided with ledges *f*, the one above the other, which are cut away at each end, forming inclined abutments, which act as stops to govern the position and inclination of the presser and receiver boards, as shown in the figure. D D' represent wooden presser and receiver boards, (the former perforated as the latter also may be,) which are journaled in pairs, one above the other, in end bars *e'*, at each side of cross-bar *e*. These pressers and receivers are so journaled in frame F that they will automatically drop into an inclined position of about sixty degrees in relation to bar *e*, and are prevented from assuming a vertical position by their upper edges abutting against the bevels or inclined ends of ledges *f*. They also vibrate upward into a horizontal position against the under side of said ledges, which will prevent them passing beyond a horizontal line, so that these ledges serve to govern the motion in either direction. The ledges have their ends beveled in such a manner as to cause the receiver and presser boards to incline in the same direction, for reasons hereafter explained. The presser-boards are so arranged and so wide that when horizontal they will close up the apertures in the frame, so that the cream will necessarily be forced through the perforations in said presser-boards as the dasher descends, and will strike violently against the solid portion of the receivers or breakers D. These receivers D are so narrow that they only cover the holes in the pressers, so that the cream after impinging against the inner surface of the receivers will readily pass from between the space inclosed by the pressers and receivers, thus allowing the succeeding currents to act with full force against the latter without being impeded by the cream below them. The holes in the pressers, or a majority of them, should be under the solid portions of the receivers, as shown in Fig. 2, and the holes in the receivers be made comparatively small, in order that there may be more surface for the currents of cream to act against. A turn-button, J, is pivoted to the under side of the cross-bar *e* in such a manner that when it is turned crosswise to the said bar it will overlap the pressers D, and will hold them rigidly against vibration. By this means their flat surfaces will be presented to the cream, both during the ascent and descent of the dasher, the receivers opposing their flat surfaces only during their descent, and the pressers being retained in a horizontal position gather the butter while the receivers are inclined, causing the general current of the cream to flow toward the center in removing the dasher from the churn in gathering the butter.

I sometimes use this button to limit the upward vibration of the pressers, by allowing them to drop to their full extent, and then turning the said button crosswise to bar *e*. In this position the pressers will abut against the beveled ends of the button, and they will have a minor degree of vibration with relation to the dasher, well suited for effectually breaking up the butter-cells. When the pressers are allowed to have their full swing button J acts as a bumper, and prevents the more fragile portions of the dasher from striking against the bottom of the churn-tub, and being broken. The dasher at all points where it is in contact with the churn-tub is beveled, thus avoiding all suction, and allowing the dasher to work freely and easily, and without any lifting action on the cream.

When the churn is in use each downward movement of the dasher will cause the pressers and receivers to vibrate upward, owing to the resistance opposed to their descent by the cream in the tub, into a horizontal position, which compresses the cream, thereby forcing it in strong currents through the perforations in the pressers, and causing it to strike violently against the under surfaces of the receivers before passing through and around them, thus rapidly breaking up the butter-cells through the hammering action thus produced, which is much increased by the free vent of the cream from between the pressers and receivers before referred to, and by the peculiar arrangement of the holes in the presser-boards heretofore mentioned. In raising the dasher the pressers and receivers drop into the inclined position shown in Fig. 2, allowing the dasher to ascend with but little labor, as both pressers and receivers are inclined in the same direction, so as to allow the cream to readily pass through, thus reducing the labor of raising the dash to a minimum, and leaving the cream as solid and as little disturbed as possible, that it may be more readily acted on, and to the greatest effect, at the next stroke. This I consider to be one of the most essential points of difference between my churn-dasher and others, as I have found by experience that, when the upward action of the dasher agitates and froths up the cream, it takes more time and labor to produce butter than when the cream is left solid; but when all the action on the cream is effected on the downstroke of the dasher, I find it necessary that its power shall be increased, which I have accomplished by the use of a set of perforated presser-boards, acting on the cream and forcing it in streams against a set of pivoted boards placed to receive it.

A slight motion of the cream in raising the dasher is unavoidable; but I take advantage of that by inclining my pressers and receivers in the same direction, so as to run all the cream together toward the center in four converging streams, the outer ends of the pressers being long enough to take in the most of the cream that passes the receivers, thus bringing the particles of butter into intimate contact with each other, so that their mutual attraction will cause them to adhere.

I am aware that pivoted wings adapted to assume a horizontal position during the descent of the dasher and an inclined one during its ascent are not new; but these wings are arranged differently from mine, neither showing solid portions of the upper set arranged to receive the impact of the streams from the apertures in the lower ones, nor the spaces at the sides of the upper set to allow free vent from between the two sets; nor are the wings arranged to drop in the same inclined position to leave the cream in a comparatively solid state, and yet produce four converging streams.

In view of the above I do not claim, broadly, perforated pivoted blades or wings; but I believe that a dasher has never been made previous to mine having a set of pressers so arranged, and so wide, as to nearly or quite fill the churn-tub, provided with holes so bored as to cause the streams passing through them to strike against the solid portions of narrower wings or receivers placed above them when the dasher is descending, and when it is rising to drop and leave the cream comparatively quiet and solid, although producing four streams converging toward the center; and I therefore claim as new and desire to secure by Letters Patent—

1. The combination, with the frame F, of the pivoted pressers D and receivers D′, constructed and arranged in the manner set forth, and for the purposes specified.

2. The combination, with the cross-bar *e*, of the end bars *e′*, constructed to receive the pressers D and receivers D′, and provided with ledges, adapted to hold them both in the same inclined position in rising and in a horizontal position in descending, substantially as described.

3. The combination of a set of pivoted and and perforated presser-boards, D, filling the area of the churn-box, with an upper set of pivoted receiving-boards, D′, of smaller area, substantially as described.

4. The churn-dasher herein described, consisting of the H-shaped frame F, having angular ledges *f f*, and provided with perforated pressers D, eccentrically pivoted in said frame, and turn-button J, substantially as described.

In testimony that I claim the above I have hereunto subscribed my name in the presence of two witnesses.

GEO. W. EICHHOLTZ.

Witnesses:

T. J. W. ROBERTSON,

C. F. BARRETT.